US007357225B2

(12) United States Patent
Dorian

(10) Patent No.: US 7,357,225 B2
(45) Date of Patent: Apr. 15, 2008

(54) TWO PART OIL OR FLUID DRAIN PLUG WITH MAGNET

(76) Inventor: George P. Dorian, 484 Corte Lenosa, Greenbrae, CA (US) 94904

( * ) Notice: Subject to any disclaimer, the term of this patent is extended or adjusted under 35 U.S.C. 154(b) by 697 days.

(21) Appl. No.: 10/913,123

(22) Filed: Aug. 5, 2004

(65) Prior Publication Data

US 2006/0054402 A1 Mar. 16, 2006

(51) Int. Cl.
*F16C 3/14* (2006.01)

(52) U.S. Cl. .................... 184/1.5; 184/105.3; 184/106; 123/196 R

(58) Field of Classification Search ................. 184/1.5, 184/105.3, 106; 123/196 R
See application file for complete search history.

(56) References Cited

U.S. PATENT DOCUMENTS

| | | | | |
|---|---|---|---|---|
| 2,242,830 A | | 5/1941 | Lisle | |
| 2,878,342 A | * | 3/1959 | Arthur | 200/61.09 |
| 3,370,144 A | | 2/1968 | Authur et al. | |
| 3,800,914 A | | 4/1974 | Miyata | |
| 3,933,358 A | | 1/1976 | Hore | |
| 3,948,481 A | | 4/1976 | Pollock | |
| 4,101,000 A | * | 7/1978 | Scully | 184/1.5 |
| 4,807,847 A | | 2/1989 | Martz | |
| 4,810,148 A | | 3/1989 | Aisa et al. | |
| 4,851,116 A | * | 7/1989 | Tomita | 210/222 |
| 5,107,808 A | | 4/1992 | Mahn et al. | |
| D341,142 S | | 11/1993 | Rogers et al. | |
| 5,411,115 A | | 5/1995 | Shropshire | |
| 5,420,557 A | * | 5/1995 | Chern | 335/305 |
| 5,465,078 A | * | 11/1995 | Jones, Jr. | 335/305 |
| 5,564,526 A | * | 10/1996 | Barnard | 184/6.25 |
| 5,588,502 A | * | 12/1996 | Bedi et al. | 184/1.5 |
| 5,634,755 A | | 6/1997 | Jones, Jr. | |
| 5,881,841 A | * | 3/1999 | Mason | 184/1.5 |
| 5,975,244 A | * | 11/1999 | Mason | 184/1.5 |
| 6,111,492 A | * | 8/2000 | Fink | 335/302 |
| 6,206,344 B1 | | 3/2001 | Takahara | |
| 6,427,427 B1 | | 8/2002 | Dietz | |
| 6,523,561 B2 | * | 2/2003 | Kapcoe et al. | 137/15.01 |
| 6,558,541 B1 | * | 5/2003 | Morrison | 210/222 |
| 2005/0098384 A1 | * | 5/2005 | Chang | 184/1.5 |

OTHER PUBLICATIONS

E Bay Store, Neomagnetics, Mar. 13, 2004, 3 pages.
Fleetworks Onsite, Power Drain, web page www.fleetworksonsite.com, Jun. 15, 2004, 2 pages.
FRAM®, Sure Drain™, product, web page www.fram.com.

* cited by examiner

*Primary Examiner*—David M Fenstermacher
(74) *Attorney, Agent, or Firm*—Thomas M. Freiburger

(57) ABSTRACT

A two part oil drain plug assembly facilitates the draining of oil or fluid from a sump, and its use prevents the threads of the sump, which may be an automotive oil pan, from becoming stripped or damaged. Further, the device aids in the determination of the physical condition (wear) of the engine, transmission or the like to which the sump is attached, by attracting metal particles to an isolated magnet on the drain plug.

8 Claims, 7 Drawing Sheets

A-A

TWO PART OIL OR FLUID DRAIN PLUG WITH MAGNET

BACKGROUND OF THE INVENTION

1. Field of the Invention

This invention relates to oil and fluid drain plugs specifically to such two part magnetic drain plugs installed in an oil sump, and as a preventative measure to prevent the threads of the sump from damage, and as a diagnostic tool to determine wear of the engine, transmission, differential housing or machine by collecting small metal fragments that may be borne in the oil or fluid.

2. Description of Prior Art

It is commonalty known that to replace oil in an internal combustion engine one must first remove the old oil. This is traditionally accomplished by unscrewing a drain plug from a sump (which includes a threaded hole for the drain plug) and letting the old oil drain into an appropriate receptacle. In general the sump is located at the lower part of the engine. After the old oil has drained the drain plug is screwed back into the sump, tightened, and new oil is added to the engine.

Whether a home mechanic or professional, there are many problems that all mechanics face when working on a vehicle. A common and frequent problem occurs when the threads of the oil sump (also called oil drain pan), which receives the drain plug, becomes damaged or stripped. This can be caused by a careless mechanic who may over tighten the drain plug, thus causing damage to the threads of the drain plug and sump. Or the mechanic may improperly align the drain plug causing the threads to become crossed.

Damage to the drain plug and sump may also be caused by normal wear and tear—removing and inserting the drain plug, properly, over and over for years during normal maintenance. Each time the drain plug is screwed in or out of the sump a small amount of metal may be shaved off of the threads of the drain plug and sump, or the threads may become deformed. A five year old vehicle may have had its oil changed 20 times, a ten year old vehicle 40 times, and a fifteen year old vehicle—60 times. The threads of a vehicle's engine oil sump can become so damaged that it is impossible to screw in the drain plug, and the cost for a proper repair (replacing the oil sump) can be several hundred dollars. In some cases, over a thousand dollars.

In addition, drain ports are often located in an inconvenient or hard to reach place on the oil sump, so a well meaning mechanic may accidentally miss-align the drain plug with the sump's drain plug threads in such a way that the threads of the drain plug and threads of the vehicle's oil sump "cross" or do not engage properly. This can destroy the threads of the vehicle's sump and drain plug.

There is usually a flexible or malleable washer (which may be made of any one, but not limited to, of the following materials; aluminum, copper, several resins of plastic, fiber washers and the like) that may be fitted with the drain plug during reinstallation. As the drain plug is screwed into the sump and tightened the washer deforms and fills voids that prevent oil from leaking out once the drain plug is reinstalled. A sealing component like a washer is important, because a metal to metal (as with a metal drain plug and the metal sump) seal is usually not sufficient to produce a fluid tight seal to prevent oil from leaking out. Also, each time a sealing washer is used it will deform in the exact shape to fill voids, and it will "remember" or keep these deformations after the drain plug has been removed from the sump. So, a washer may not re-deform itself properly during a second installation to sufficiently to fill voids to form an oil tight seal again. So, in proper usage, a washer should only be used once. However, many individuals do not replace the washer. This may be because of the inconvenience of traveling to an automotive retail store to purchase a new washer, carelessness, or lack of knowledge. If a washer is reused it may not fill voids properly and can cause oil to leak out and drip on to the garage floor, or else ware.

Many auto manufactures use a magnetic drain plug with their engines, transmissions and differentials. Also, many after market manufactures sell magnetic drain plugs. These magnetic drain plugs collect small metal fragments that may be borne in the oil. Such a magnetic drain plug is sometimes used in lieu of an oil filter. Also, such a magnetic drain plug can be used as a diagnostic tool. If, while in the process of draining oil, one finds metal fragments on the magnet it may be an indication of excessive wear in the engine, transmission or differential, and that appropriate remedies may be in order. In the case of a hydraulic system, if metal fragment are borne in hydraulic fluid these fragments may become lodged in seals and cause them to leak.

When installing a magnetic drain plug into a steel sump, or steel fitting screwed into a sump, it is common for the magnet in the plug to be attracted to the steel sump or fitting and stick to it before threads can be engaged. Then the mechanic will have to pull the drain plug off and attempt to reinstall the drain plug again. This procedure may have to be repeated several times until the threads of the drain plug can be engaged properly. This problem is exacerbated if the location of the drain hole, of the oil sump, is not easily seen and/or reached by the mechanic, as is common on many cars and other machinery. This is a common problem with magnetic drain plugs and can be a cause in causing the sump threads to become crossed. In my review of prior art I have not seen any invention or product that addresses this problem.

In recent years products have appeared on the market which allow one to vacuum oil out of the dip stick tube of an engine. These devises are becoming increasingly popular with automotive shops. However, these products may be prohibitive to the home mechanic because of their cost. So, the traditional oil drain plugs will still be in use for some time to come.

U.S. Pat. No. 2,242,830 to Lisle (May 20, 1941) Entitled Magnetic Plug

This invention is a single part drain and fill plug with a magnet for attracting metal fragments. Many oil sumps are manufactured from steel. When installing a magnetic drain plug into such an oil sump it is common for the magnet to be attracted to the steel oil sump, as the magnet comes close to it, and stick to it before the threads can be engaged in the oil sump's drain plug threads. Then the mechanic will have to pull the drain plug off of the oil sump and attempt to reinstall the drain plug again. This procedure may have to be repeated several times until the threads of the drain plug and the oil sump can be engaged properly. This problem is exacerbated if the location of the drain hole, of the oil sump, is not easily seen and/or reached by the mechanic, as is common on many cars and other machinery. This is a common problem with magnetic drain plugs an can be a factor in causing the sump threads to become crossed. The Lisle plug will only fit into a certain type of thread of an oil sump, in particular, tapered pipe threads.

U.S. Pat. No. 3,370,144 to Arthur and Graham (Feb. 20, 1968) Entitled Securing Means for Plugs and the Like This invention is a two part plug with a magnet for attracting metal fragments. This plug has an outer fitting body that is screwed into an oil sump and an inner bolt body that is installed and locked into the outer fitting body to seal oil from draining out. This plug is not intended to drain oil from a sump; however, a modification of outer fitting will allow oil to drain out when the inner bolt body is removed. The Arthur and Richard plug incorporates a number of flanges, a locking pin, a spring and a valve mechanism. This scheme can be costly to manufacture. Also, the plug protrudes into the oil sump significantly. This may exclude this plug from being used in some applications, as the protuberance may interfere with moving or non-moving parts in the engine, transmission, or other machine. No mention is made as to the type of metal used for this plug. However, installation of the inner bolt body could be problematical if the outer fitting is made from steel or some other magnetic metal. In this case, the magnetic inner bolt body will be attracted to the steel outer fitting body during installation of the inner bolt body. The magnet may stick to the outer fitting before the inner bolt body can be properly engaged to the outer fitting body. Then the mechanic will have to pull the inner bolt body off of the outer fitting body and attempt to reinstall the inner bolt body again. This procedure may have to be repeated several times until the inner bolt body can be properly engaged to the outer fitting body. This problem is exacerbated if the location of the drain hole, of the oil sump, is not easily seen and/or reached by the mechanic, as is common on many cars and other machinery. This plug requires a washer when installing the outer fitting into the oil sump.

U.S. Pat. No. 3,800,914 to Miyata (Apr. 2, 1974) Entitled Magnetic Filter for Lubricants This invention is intended to collect metal particles, by means of a series of magnets, which may be borne in the oil of an engine, transmission, or machine that uses oil. This invention is not intended to be used as a drain plug. This is evident in FIG. 1 of the patent where in the drawing a drain plug (DP) is shown. The Miyata invention uses an elaborate series of magnets and extending vanes, which can be costly to manufacture.

U.S. Pat. No. 3,933,358 to Hoer (Jan. 20, 1976) Entitled O-ring Port Contour Sheath and Seal This invention is a drain plug that implements an O-ring located next to the head of the drain bolt body for the purpose of forming an oil tight seal. This O-ring is exposed to road dirt and in time such grit may abrade the O-ring causing it to leak.

U.S. Pat. No. 3,948,481 to Pollock (Apr. 6, 1976) Entitled Draincock for Automotive Cooling System This invention is a draincock, or drain valve, intended for use in vehicle radiators. It has an outer fitting body and an inner bolt body that is not removable from the outer fitting body. In the closed state the threads of the inner bolt body are exposed by contamination to dirt. This invention has a relatively small drain bore, so it is not efficient to be used to drain oil which is more viscous than radiator fluid.

U.S. Pat. No. 4,807,847 to Marts (Feb. 28, 1989) Entitled Valved Oil Pan Plug

This invention is a drain valve intended for use in oil sumps. It has an outer fitting body and an inner bolt body. The inner bolt body is screwed into the outer fitting body until a conical shape of the inner bolt body contacts with a like conical shape in the bore of the outer bolt body and this forms a seal. Draining oil is accomplished by unscrewing the inner bolt body. In the closed state, the threads of the inner bolt body are exposed to contamination by dirt. This drain plug is relatively long, as drain plugs go, and this may be a liability. Since the drain plugs of most vehicles are at the lowest part if an engine or transmission, and are often mounted in the sump in such a way that the drain plug is in a downward position, it is a liability to have a long drain plug protrude below the engine or transmission because a rock or speed bump may knock off such a drain plug, causing oil to unintentionally drain out of the sump. The invention has a self-tapping feature to re-tap warn threads. By definition, a cutting tool must be harder than the metal that its cutting. Typically thread tapping cutters are made from hardened steel, with a Rockwell hardness of HRC60 or more. This allows for clean and efficient cutting of threads in metals, as in oil sumps. No mention is made in the patent as to the hardness of the outer fitting body—which includes the self-tapping feature. However, fittings and bolts are typically manufactured from non-hardened soft to medium hardness metals such as low to medium carbon steel or pot metal. Also, a proper threading tap has pointed flutes that efficiently cut threads. This invention does not have this feature, and will not cut threads efficiently. So the self threading feature of this invention is inefficient in cutting clean threads in an oil sump. Also, each time the outer fitting body of this invention is screwed in or out of the oil sump it will re-cut threads in the sump, although not efficiently as stated above. If the outer fitting body is screwed in and out of the sump several times it may eventually destroy the oil sump threads. Many mechanics whom I've talked to have indicated to me that a self tapping drain plug is a concern for those reasons.

U.S. Pat. No. 4,810,148 to Aisa et al. (Mar. 7, 1989) Entitled Drain Bolt

This invention is a single part drain and fill plug with a magnet for attracting steel metal fragments. Many oil sumps are manufactured from steel. When installing a magnetic drain plug into such an oil sump it is common for the magnet to be attracted to the steel oil sump, as the magnet comes close to it, and sticks to it before the threads can be engaged in the oil sump's drain plug threads. Then the mechanic will have to pull the drain plug off of the oil sump and attempt to reinstall the drain plug again. This procedure may have to be repeated several times until the threads of the drain plug and the oil sump can be engaged properly. This problem is exacerbated if the location of the drain hole, of the oil sump, is not easily seen and/or reached by the mechanic, as is common on many cars and other machinery. This is a common problem with magnetic drain plugs and can be a factor in causing the sump threads to become crossed. Also, the plug protrudes into the oil sump significantly. This may exclude the plug from being used in some applications, as this protuberance may interfere with moving or non-moving parts in the engine, transmission, or other machinery.

U.S. Pat. No. 5,107,808 to Mahn et al. (Apr. 28, 1992) Entitled Reservoir Assembly Having a Drain Therein This invention is similar to the invention of U.S. Pat. No. 3,933,358 above. Both drain plugs implement an O-ring located next to the head of the drain bolt body. The O-ring is used to seal oil. This O-ring is exposed to road dirt and grit, and in time such dirt and grit may abrade the O-ring causing a leak.

U.S. Pat. No. 5,411,115 to Shropshire (May 2, 1995) Entitled Oil Drain Plug

This invention is a drain valve used to drain oil from a sump. This drain valve is relatively long and this may be a liability. Since the drain plugs of most vehicles are at the lowest part if an engine or transmission, and are often mounted in the sump in such a way that the drain plug is in a downward position, it is a liability to have a long drain plug protrude below the engine or transmission because a rock or speed bump may knock off such a drain plug, causing oil to unintentionally drain out of the sump.

U.S. Pat. No. 5,564,526 Barnard (Oct. 15, 1996) Entitled Magnetic Drain Plug

This invention facilitates a separate magnet that is placed on, and adheres to, the existing oil drain plug.

U.S. Pat. No. 5,465,078 to Jones, Jr. (Nov. 7, 1995) Entitled Magnetic Drain Bolt, and U.S. Pat. No. 5,634,755 to Jones, Jr. (Jun. 3, 1997) Entitled Magnetic Drain Bolt These two inventions are similar to each other and to the invention of U.S. Pat. No. 4,810,148 above. These two inventions are a single part magnetic drain and fill plugs. Many oil sumps are manufactured from steel. When installing a magnetic drain plug into such an oil sump it is common for the magnet to be attracted to the steel sump, as the magnet comes close to it, and stick to it before the threads can be engaged in the sump's drain plug threads. Then the mechanic will have to pull the drain plug off of the oil sump and attempt to reinstall the drain plug again. This procedure may have to be repeated several times until the threads of the drain plug and the oil sump can be engaged properly. This problem is exacerbated if the location of the drain hole, of the oil sump, is not easily seen and/or reached by the mechanic, as is common on many cars and other machinery. This is a common problem with magnetic drain plugs and cam be a factor in causing the sump threads to become crossed. Also, the plug protrudes into the oil sump significantly. This may exclude the plug from being used in some applications, as this protuberance may interfere with moving or non-moving parts in the engine, transmission, or other machinery. The two plugs have an elastomer that seals oil.

U.S. Pat. No. 6,206,344 B1 to Takahara (Mar. 27, 2001) Entitled Oil Drain Plug Fro Oil Storage Vessel and Oil Drain Device Using Same This invention incorporates an elaborate and expensive mechanism to draw oil from a sump. This invention is cost prohibitive for most car owners.

U.S. Pat. No. 6,427,427 B1 to Dietz (Aug. 6, 2002) Entitled Oil Drain and Sight Gauge for Internal Combustion Engine This invention includes a valve body which incorporates a conical shape for sealing. The valve body is partially unscrewed, but not removed from the outer body, to drain oil. Oil drains through an aperture in the outer body. This invention has no magnet to draw out metal fragments.

U.S. Pat. No. D341,142 to Rogers, et al. (Nov. 9, 1993) Entitled Replacement Oil Drain Plug This invention uses a rubber stopper in conjunction with a hinged mechanism and screw to form a seal with the oil drain port of an oil sump.

eBay Web Page (Printed Mar. 13, 2004)

As can be seen from the enclosed eBay printout, there are numerous magnetic oil drain plugs on the market of similar designs. In most cases the only notable difference between drain plugs is in the thread type of the bolt body. Different thread types facilitate installing eventually the same drain plug into different oil sumps. Some oil drain plugs have an integral O-ring, or the like, to seal oil. However, as described above, this O-ring is exposed to road dirt and grit, and in time such dirt and grit may abrade the O-ring causing a leak. Also, as described above, many oil sumps are manufactured from steel which will be attracted by a magnet. When installing a drain plug, containing a magnet, into such an oil sump it is common for the magnet to be attracted to the steel oil sump as the magnet comes close to it and stick to it before the threads can be engaged in the oil sump's drain threads. Then the mechanic will have to pull the drain plug off of the oil sump and attempt to reinstall the drain plug again. This procedure may have to be repeated several times until the threads of the drain plug and the oil sump can be engaged. This problem is exacerbated if the position into which the drain port is located on the oil sump is not easily seen and/or reached by the mechanic, as is common on many cars and other machinery. Also, the plug protrudes into the oil sump significantly. This may exclude the plug from being used in some applications, as the protuberance may interfere with moving or non-moving parts in the engine, transmission, or other machinery.

FLEETWORKS ONSITE™, Power Drain, Web Page www.fleetworksonsite.net

This is a device that implants a valved drain plug that is semi-permanently screwed into the vehicle's oil drain pan (as with my invention). To drain oil, a second fitting with a tube is connected to the first fitting then oil is suctioned out with a pump. The pump is cost prohibitive for most home mechanics. This design may well be used with oil change shops; however this assumes that the oil change shop has the secondary tubed fitting and pump. If not, the oil change mechanic will be required to remove the first fitting, and this negates the advantages of a semi-permanent oil drain pan fitting. This product does not have a magnet.

MOTORMITE, Transmission Drain Plug Kit Part# 65241.

This product consists of a large threaded fitting with a coaxial bore, a nut for mounting the fitting in an oil drain pan, and a smaller drain plug bolt body. This product is intended for the customer to drill a hole into an oil drain pan then secure the larger fitting to the drain pan with the nut. The smaller drain plug bolt body is then unscrewed to drain oil. It is the intent of this product to allow the customer to modify an oil drain pan that may not have originally had a drain bolt.

MOTORMITE, Piggyback Single Oversized Drain Plug Part#65208

This product consists of a large threaded fitting with a coaxial bore, and a smaller drain plug bolt body. The threaded part of the large fitting has an integrated thread cutting feature to reform stripped oil pan threads. However, the product is made from a low hardness metal, so it my not cut threads efficiently. To cut or reform threads requires a thread die made from metal that is approximately HRC60 hardness. The secondary plug bolt body has a tapered thread that screws into the larger fitting. This plug bolt body is unscrewed to drain oil. To form a leak proof seal the user should apply a thread sealer to the tapered threads of the plug's tapered threads. This thread sealer may be in the form of Teflon Tape or a silicone type sealer. This troublesome extra step is often not done, and the result is a slow leak of oil which forms an oily mess on the garage floor. My invention is designed in such a way that no thread sealer in necessary.

FRAM®, SureDrain™, Web Page www.fram.com

This device is similar to the Power Drain product. It implants a valved drain plug that is semi-permanently screwed into the vehicle's oil drain pan (as with my invention). To drain oil, a second fitting with a tube is connected to the first fitting then oil is drained out by gravity. There is no pump, so this product is useful for home mechanics. This design may well be used with oil change shops; however this assumes that the oil change shop has the secondary tubed fitting. If not, the oil change mechanic will be required to remove the first fitting, and this negates the advantages of a semi-permanent oil drain pan fitting. This product does not have a magnet.

My development research for this invention is based on personal experience as a home mechanic for over 30 years and talking with other home mechanics, professional mechanics, automotive teachers, and auto parts store sales people. By far most mechanics (home or professional) whom I've talked to have experienced stripped oil sump threads. Also, they seem unsatisfied with current products that attempt to solve these issues. My research is also based on review of written documentation of other products and patents relating to this subject. In my research I felt that no available product or invention seemed to address all of the issues outlined above in a practical way. However, I feel that my invention is the best practical solution for all of the above issues. This will be explained the in section entitled SUMMARY OF THE INVENTION.

SUMMARY OF THE INVENTION

My invention is a two part drain plug which I developed in light of, and to solve, the numerous issues and problems regarding the general state of sump drain plugs as described in the above section entitled Description of Prior Art. I feel that my invention is the best practical way to solve those problems of any drain plug that I've studied in my research. The reader may wish to refer to the enclosed drawings while reading the following text.

In the preferred embodiment it is a general object of the present invention to provide a two part sump drain plug wherein sump drain port threads 30 are preserved in the following way: A fitting 1 is semi-permanently screwed into the sump 3. A separate plug 2 is unscrewed from the fitting 1 to drain oil 12. Once the oil is drained from the sump the plug is reinserted and tightened into the fitting, and new oil may be added to the sump. After numerous drain cycles the internal threads 10 of the fitting and the external threads 11 of the plug may become stripped because of carelessness, abuse or just normal ware. If this happens the vehicle owner may remove the fitting from the sump and replace both fitting and plug with new ones. This would happen infrequently. So instead of removing and reinstalling a conventional drain plug into an oil sump approximately 20 times over a five year period (as one would do to comply with regular vehicle maintenance), with my invention only one or two fittings may need to be screwed into the sump during the same period of time. Thus the sump threads 30 are exposed to far less wear and are preserved, so the invention solves the problem of stripped out sump threads. It is notable that my invention is intended to be used as a proactive measure—to preserve sump threads before they become stripped. That is, my invention is not intended to repair damaged sump threads. To properly repair damaged threads one should use appropriate tools or replace the sump, and this is beyond the scope of my invention.

It is another object of the invention to provide a two part sump drain plug that would fit on, but not limited to, a variety of engines, transmissions, differentials and transaxles of vehicles, motorcycles, hydraulic sumps and other machines using a sump 3.

It is another object of the invention to provide a two part sump drain plug wherein the problem of engaging drain plug threads is solved in the following way: It is often inconvenient and difficult for one to reach the drain port of an oil sump 3, and this is often a cause of crossing drain plug threads 30. The reader may wish to refer to FIG. 4. My invention has a self aligning feature to aid the mechanic in inserting the plug 2 into the fitting 1. This feature is composed of a long nose 16 on the plug 2 and a non-threaded area 15 just in front of the plug's external threads 11. As the plug is inserted into the fitting, the nose 16 of the plug enters the internal threaded bore 10 of the fitting. This internal threaded part of the fitting is relatively large in diameter, so this makes an easy target area for the mechanic to locate the plug to the fitting. As the plug is further inserted into the fitting the nose of the plug enters the smaller smooth bore area 18 of the fitting. At the same time the non-threaded area 15 just in front of the plug's threads are centered within the first internal treads 17 of the fitting. So there is a two point alignment, at the front of the plug and to the rear of the plug. As the plug is inserted even further the threads 11 of the plug and threads 10 of the fitting start to engage. By this time the threads of the plug and fitting should be aligned such that they will not cross. It is notable that a number of test subjects have easily and consistently inserted prototypes of the plug of my invention into the fitting and screwed the two together—with their eyes closed. This is not a trivial matter, as many sump ports are difficult to reach or see from under a car.

It is another object of the invention to provide a two part sump drain plug wherein the invention incorporates a magnet 19, made of a rare earth Neodymium magnet, to draw out metal fragments 20 that may be borne in oil 12. The reader may wish to refer to FIG. 5. In many transmissions and most all differentials there is no oil filter, so a magnetic oil plug is used in lieu of a filter to prevent metal fragments from interfering with gears and other moving parts. Also, a magnet is useful even in systems that do incorporate a filter, because metal fragments tend to settle to the bottom of the sump and may not be picked up with the oil by the oil pump. In any case, the magnet will collect metal fragments that may be borne in the oil. If, for example, while changing engine oil one discovers metal fragments on the magnet it may be an indication of excessive wear and repairs may be needed. So, in ether case, the magnet is a diagnostic tool.

It is another object of the invention to provide a two part sump drain plug wherein the magnet 19 in the plug body 2 will not stick to the fitting body 1 during reinstallation into the fitting 1. Although useful, there is an inherent problem with magnetic oil plugs in general—they tend to be difficult to install. My invention solves this problem in the following way: As described above, many oil sumps are manufactured from steel which will be attracted by a magnet. When installing a magnetic drain plug into such an oil sump it is common for the magnet to be attracted to the steel oil sump and stick to it before the threads or the plug can be engaged. Then the mechanic will have to pull the drain plug off of the oil sump and attempt to reinstall the drain plug again. This procedure may have to be repeated several times until the threads of the drain plug and the sump can be engaged properly. This problem is exacerbated if the position in which the drain port is located on the oil sump is not easily seen and/or reached by the mechanic—as is common on many vehicles and other machinery. Some other two part oil plugs also have a magnetic plug, however if the fitting into which the plug is inserted is made of steel or some other metal that is attracted by a magnet, then the same problem occurs. My invention solves this problem by using a non-magnetic Stainless Steel alloy. As one inserts the magnetic plug 2 of my invention into the fitting 1 there is no tendency of the magnet 19 to stick to the fitting 1.

It is another object of the invention to provide a two part sump drain plug wherein no washer is required to seal oil or fluid. Some drain plugs require a washer to form a seal between the sump and plug. The reader may whish to refer to FIG. 4 and FIG. 5. As explained above in the prior art section, a washer is a one time use part. However, many individuals do not replace the washer when draining oil. This may be because of the inconvenience of traveling to an automotive retail store to purchase a new washer, carelessness, or lack of knowledge. If a washer is reused it may not fill voids properly causing drops to leak out on to the garage floor, or elsewhere. My invention solves the problem of washers in the following way: The seal between the sump 3 and fitting 1 is formed with an O-ring 21. And the seal between the fitting 1 and the plug 2 is formed by the conical shape 22 in the fitting 1 and the matching conical shape 23 on the plug 2. In both cases no washer is required. It is notable that the conical shapes 22 and 23 are located near the axial center of the fitting. This is done to protect this sealing surface from road dirt and grit. It is also notable that the O-ring 21 of the fitting 1 may fill relatively large voids 31 between the sump 3 and fitting 1. These voids may exist because of unevenness of the sump's outside surface or the axes of the sump port threads 30 may not be exactly perpendicular to the sump's outside surface.

It is another object of the invention to provide a two part sump drain plug that does not protrude excessively far below the outside of the sump 3. As described above in the section Description of Prior Art, some sump drain plugs or valves are relatively long as drain plugs go, and this may be a liability. Drain plugs of most vehicles are at the lowest part of an engine or transmission, and are often mounted in the sump in such a way that the drain plug is in a downward position. It is a liability to have a long drain plug protrude below the engine or transmission because a rock or speed bump may knock off such a drain plug, causing oil to unintentionally drain out of the sump. My drain plug invention protrudes relatively little from the bottom of an oil sump, so this poses little liability.

It is another object of the invention to provide a two part sump drain plug that is manufactured with a high degree of quality. Many oil plugs are poorly manufactured. This includes poorly formed threads which cause a loose engagement with the threads in the oil sump. This, in turn, is another cause of crossing threads. My invention solves this problem by the method of its manufacture. My invention is precision CNC machined to ANSI/ASME standards so the threads 13 of the fitting body 1 fully engage into the threads of the oil sump 3.

The present invention meets or exceeds all the above objects and advantages. Upon further study of the specification and detailed description in conjunction with the accompanying drawings and claims, further objects and advantages of this invention may become manifest to those skilled in the art.

DESCRIPTION OF THE PREFERRED EMBODIMENTS

My invention is a two part drain plug which I developed in light of, and to solve, the numerous issues and problems described in the above section entitled Description of Prior Art. I feel that my invention is the best practical way to solve those problems of any that I've seen in my research.

Figure 1:
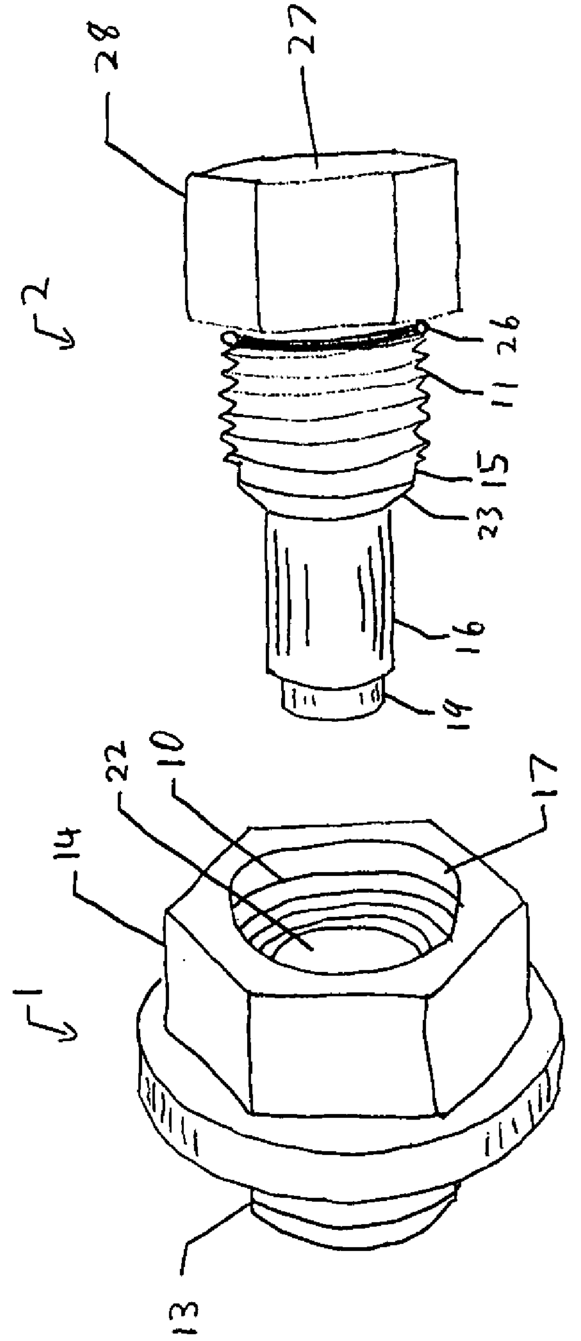
FIG. 1 is an isometric view of the present invention.

Referring to the accompanying drawings. FIG. 1 shows an isometric view of my invention, a two part drain plug. The two parts consist of a fitting body 1 and a plug body 2 that are machined from 303 Alloy Stainless Steel.

Figure 2:
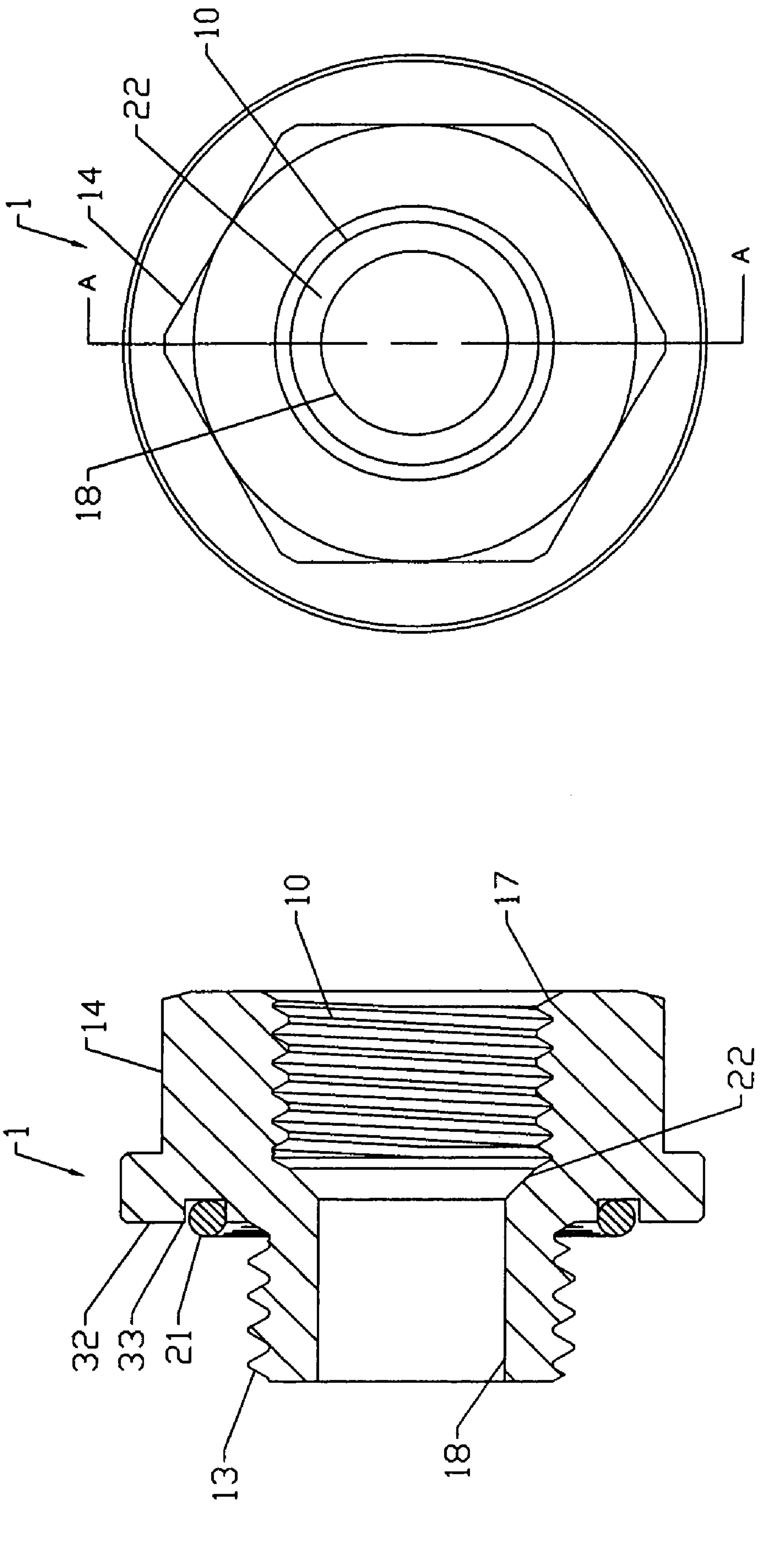
FIG. 2 is a sectional view of the fitting body of the present invention.

FIG. 2 is a drawing of the fitting body 1. The fitting body 1 consists of; an external threaded area 13 that screws into the oil port threads 30 of a sump 3: a face area 32 that makes contact with the outside surface of the sump 25: an area with wrench flats 14: an O-ring 21 to seal the fitting body 1 with the outside surface of the sump 25 to prevent oil 12 from leaking out: an axial bore with a smooth area 18, an conical shape 22 and an internal threaded area 10.

Figure 3:
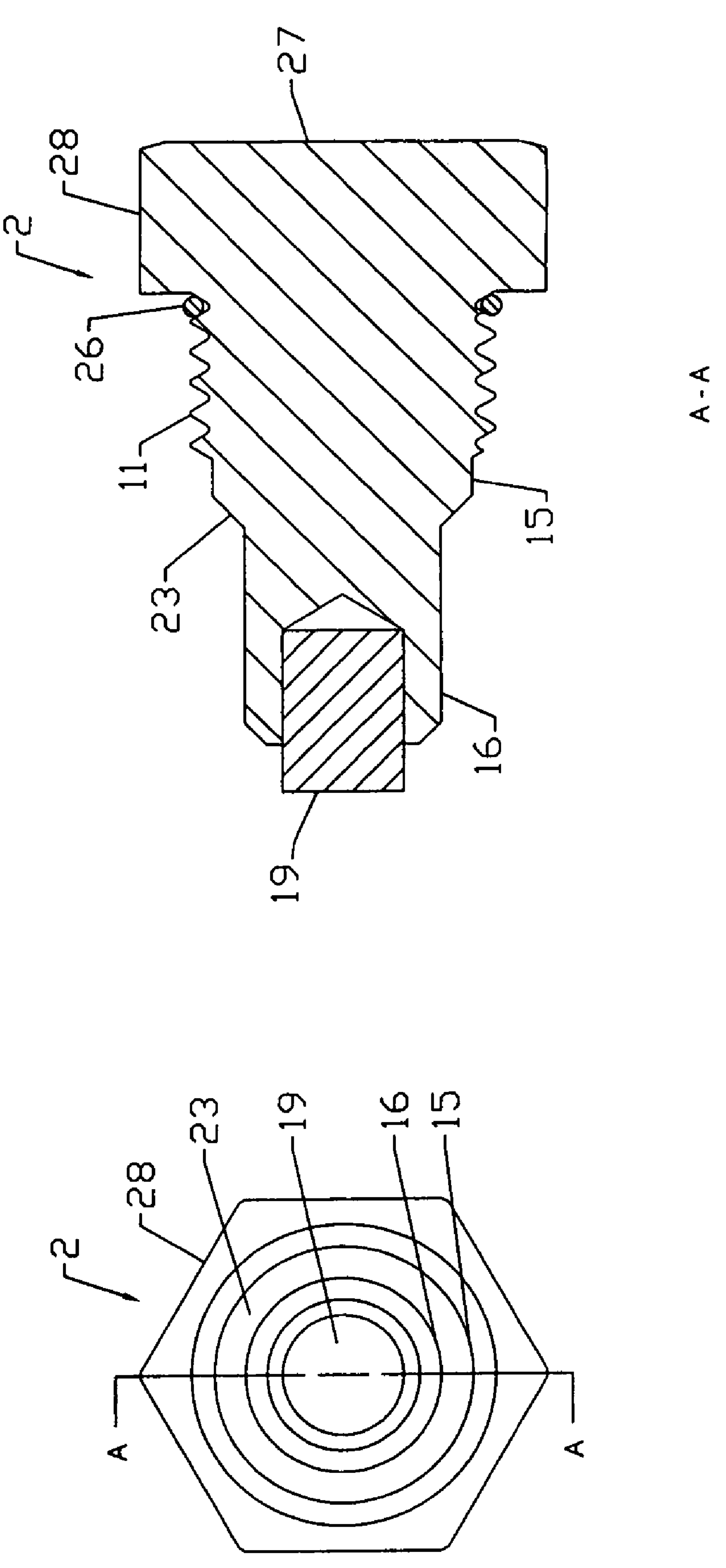
FIG. 3 is a sectional view of the bolt body of the present invention.

FIG. 3 is a drawing of the plug body 2. The plug body 2 consists of: a head area 27 with wrench flats 28, serving as a tool engagement end of the plug body; an external threaded area 11; a non-threaded area 15 just in front of the threaded area 11; a conical shape 23 that forms a seal with the conical shape 22 of the fitting body 1 when the plug body 2 is screwed into and tightened to the fitting body 1; and a nose 16 that is used to aid in inserting the plug body 2 into the fitting body 1 and to hold a magnet 19. In this embodiment, the magnet 19 is cylindrical in shape and is press fitted into a hole drilled into the end of the nose area 16 of the plug body 2. The magnet 19 is made of a rare earth Neodymium material. The plug body 2 also includes an O-ring 26 to prevent dirt from entering the threaded area 10 and 11 while the plug body 2 is screwed into the fitting body 1, as can be seen in FIG. 5.

Figure 4:
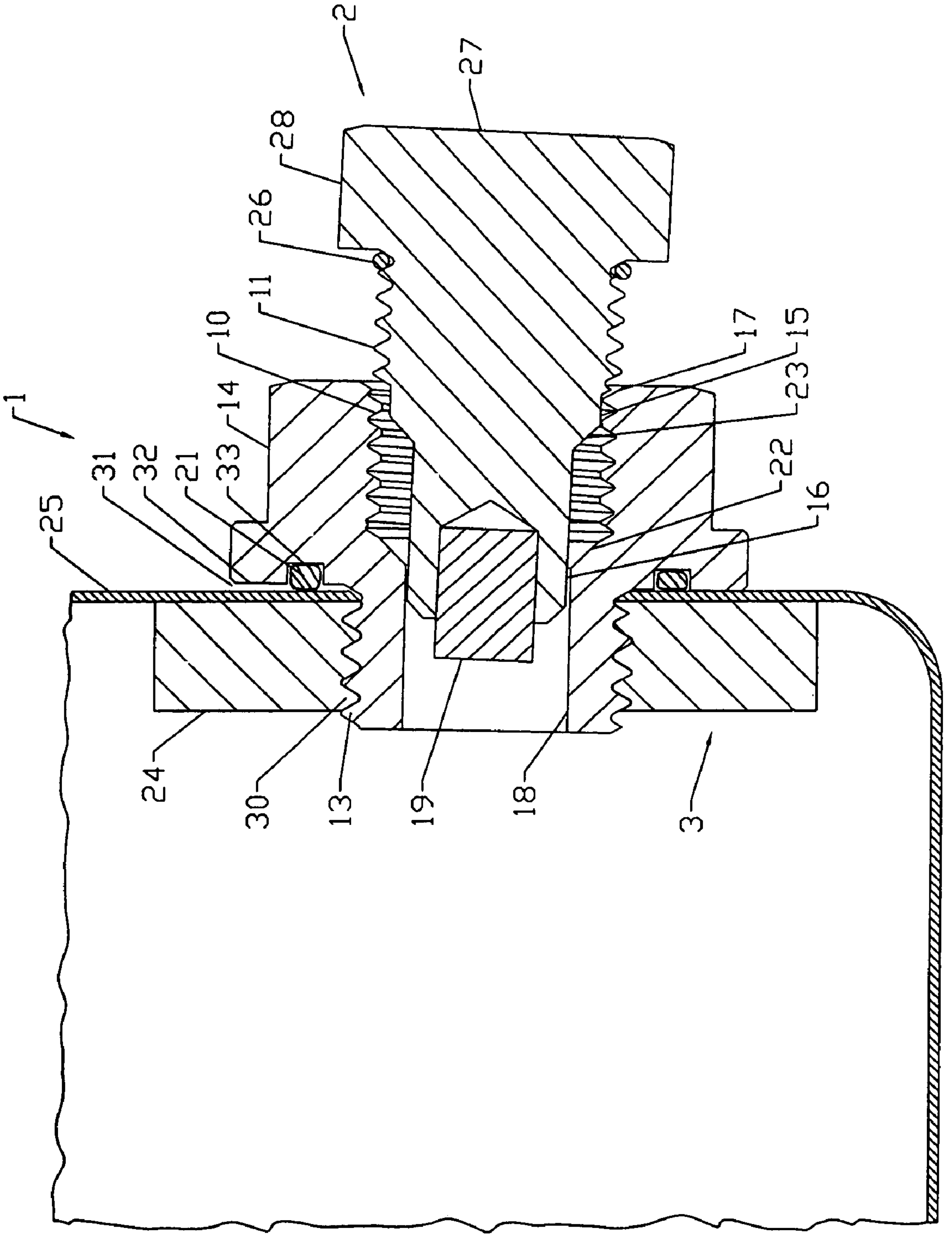
FIG. 4 is a sectional view of the fitting body and bolt body of the present invention featuring the self aligning feature.

The primary intent of FIG. 4 is to show the self aligning feature of my invention and the ability if the O-ring 21 to form a seal with the sump 3. My invention has a self aligning feature to aid the mechanic in inserting the plug 2 into the fitting 1. This feature is composed of a long nose 16 on the plug body 2 and a non-threaded area 15 just in front of the plug body's external threads 11. As the plug body 2 is inserted into the fitting body 1, the nose 16 of the plug body 2 enters the internal threaded bore 10 of the fitting body 1. This internal threaded part 10 of the fitting body 1 is relatively large in diameter, so this makes an easy target area for the mechanic to locate the nose 16 of the plug body 2 to the fitting body 1. As the plug body 2 is further inserted into the fitting body 1 the nose 16 of the plug body 2 enters the smaller smooth bore area 18 of the fitting body 1. At the same time the non-threaded area 15 just in front of the plug body's 2 threads 11 are centered within the first internal thread 17 of the fitting body 1. So there is a two point alignment, at the front of the plug body 2 and at its mid-section. FIG. 4 shows my invention at this juncture.

FIG. 4 also shows the ability of the fitting body 1 to form a seal with uneven sump surface 25. There is at times a significant gap 31 when mating a drain plug to a sump. A circular grove 33 is cut in the face 32 of the fitting body 1 in such a way that the O-ring 21 will have sufficient material projecting from the face 32 of the fitting body 1 such as to make contact with the sump to fill significant voids 31.

Figure 5:
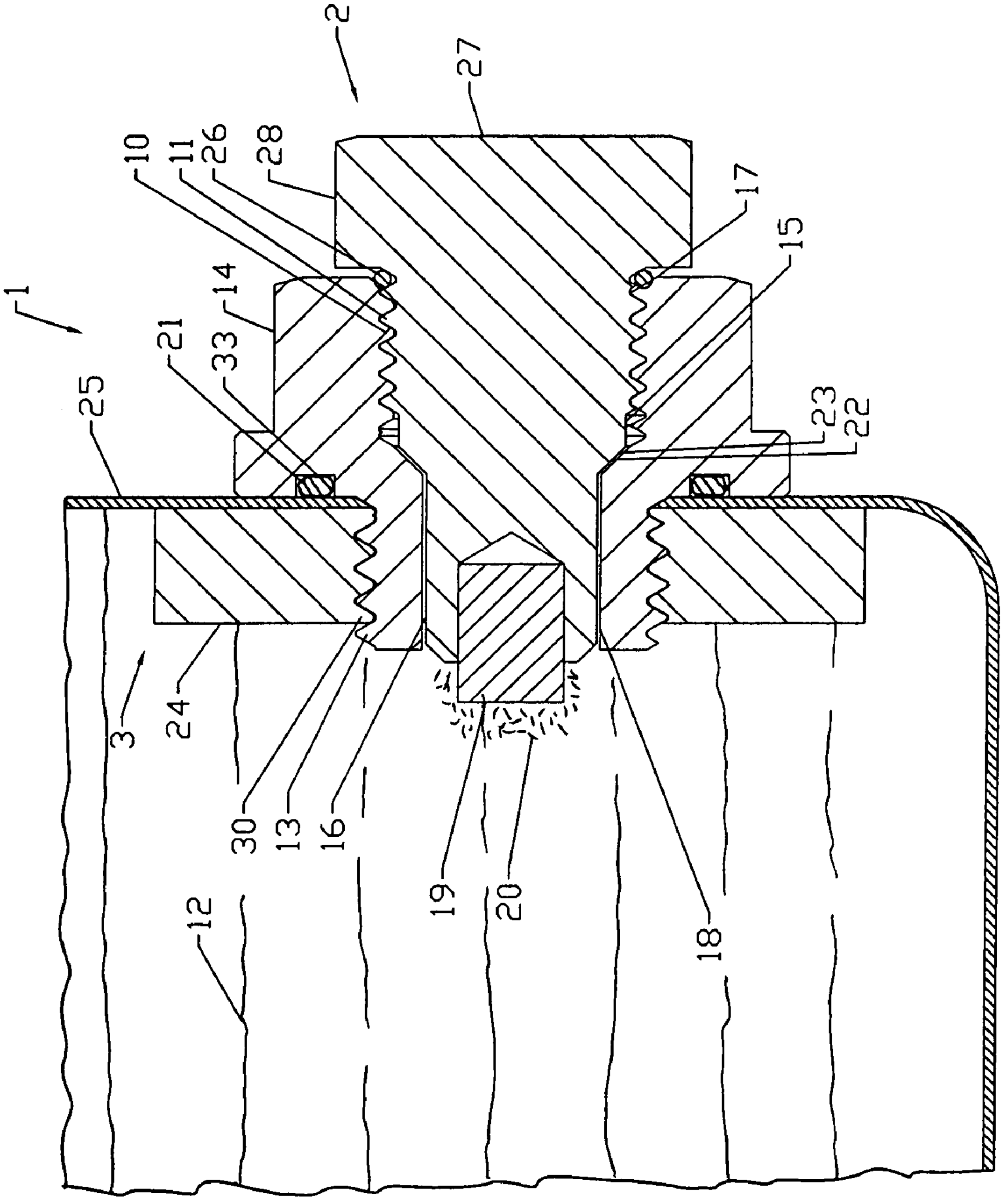
FIG. 5 is a sectional view of the fitting body and bolt body of the present invention installed into a sump.

FIG. 5 shows the fitting body 1 screwed and tightened into a sump 3 and the plug body 2 screwed and tightened into the fitting body 1. This figure also shows the O-ring 26 in its compressed state to keep out dirt. This figure shows the conical shape 22 of the fitting body 1 making contact with the conical shape 23 of the plug body 2 to form an oil tight seal. This figure also shows a sump 3 with oil 12 and metal fragments 20 attached to the magnet 19.

Additional Embodiments:

As an additional embodiment of the invention the fitting body 1 and plug body 2 may be formed from, but not limited to, 304 Alloy Stainless Steel or brass or other alloys of Stainless Steel or brass or other non-magnetic metal.

As an additional embodiment of the invention the external thread 13 of the fitting body 1 may be of any, but not limited to, the following threads; ½"-20, ⅝"-18, ¾"-16, M12-1.25, M12-1.5, M12-1.75, M14-1.25, M14-1.5, M16-1.5, M18-1.5, M20-1.5, M22-1.5, M24-1.5, M26-1.5, ¾ NPT (American National Standard Taper Pipe Thread), ½ NPT. Thus facilitating the use of this invention on a variety of different makes and models of vehicles, engines, transmissions, differentials, oiled air compressors, oiled vacuum pumps, hydraulic sumps, and other machinery using a sump.

Figure 6:
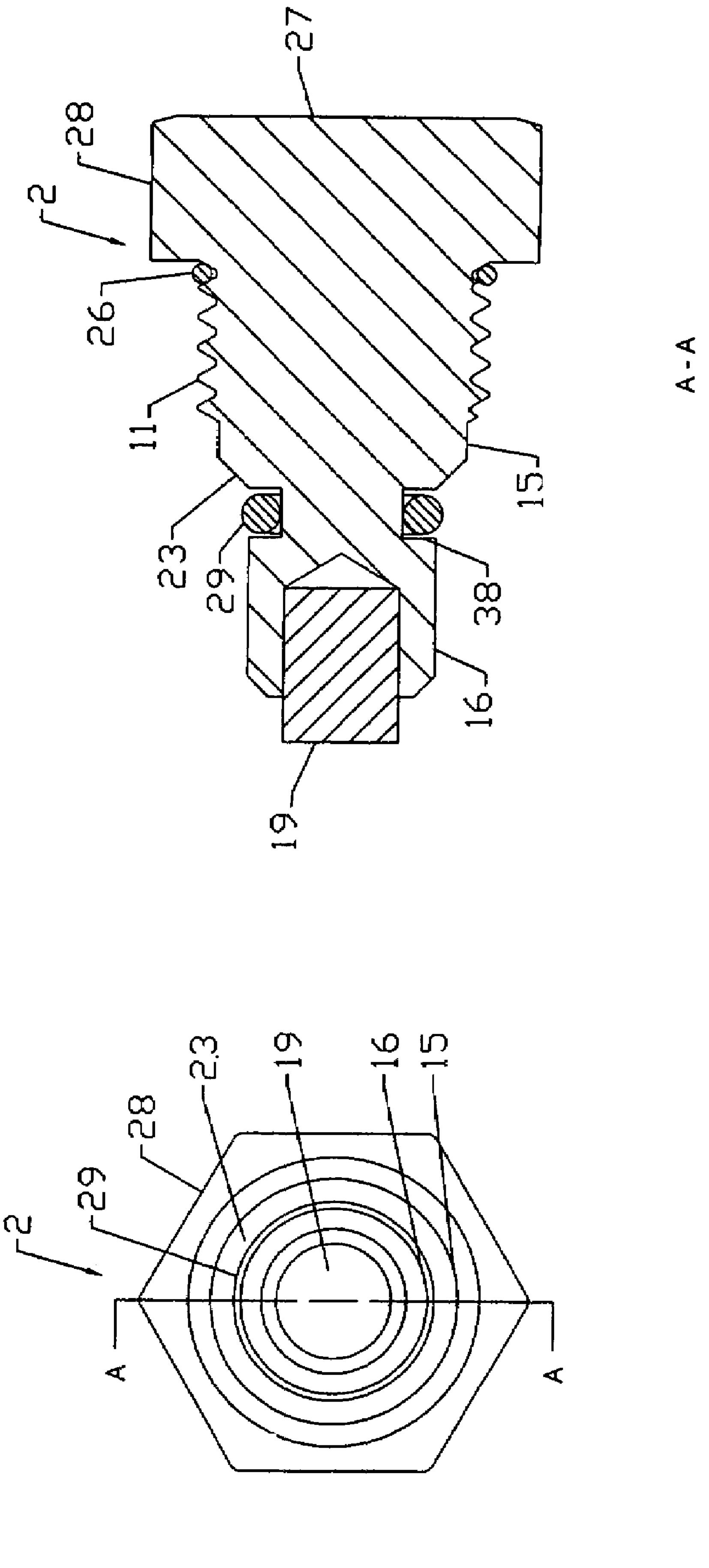
FIG. 6 is a sectional view of the bolt body showing an additional embodiment of the invention with a grove and O-ring providing added sealing affect against oil leakage.
Figure 8:
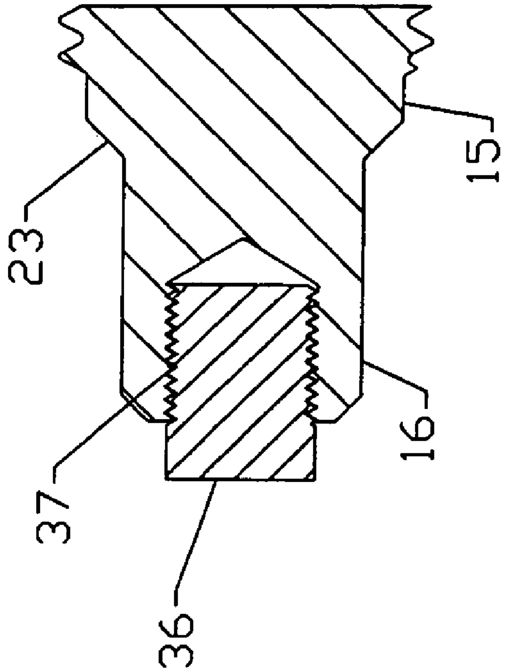
FIG. 8 is a sectional view of the bolt body showing an additional embodiment of the invention, a threaded magnet.

As an additional embodiment of the invention a tapered magnet 34 may be fitted into a matching taper 35 in the plug body 2 as shown in FIG. 6.

Figure 7:
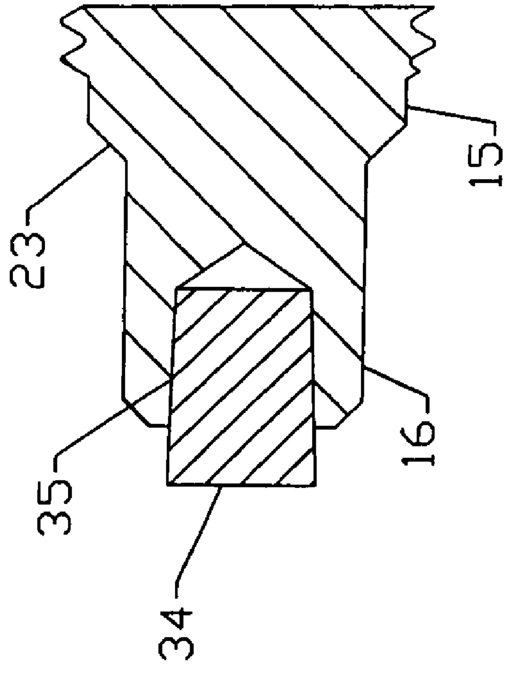
FIG. 7 is a sectional view of the bolt body showing an additional embodiment of the invention, a tapered magnet.

As an additional embodiment of the invention a threaded magnet 36 may be fitted into a matching thread 37 in the plug body 2 as shown in FIG. 7. The magnet 36 is screwed into the plug body's 2 threaded nose 37 to hold the magnet 19 in place.

As an additional embodiment of the invention the magnet 19 may be excluded.

As an additional embodiment of the invention the O-ring 26 may be eliminated from the plug body 2

As an additional embodiment of the invention the O-ring 21 of the fitting body 1 may be eliminated. A commercially available washer may be substituted.

As an additional embodiment of the invention a grove 38 may be machined into the plug body 2 and an O-ring 29 installed into that location to provide added sealing affect against oil leakage.

Modifications and variations of the present invention are possible in light of the above teachings. It therefore is to be understood that, within the scope of the appended claims, the invention may be practiced otherwise than as specifically described.

I claim:

1. A drain plug assembly comprising:

an outer fitting body comprised of a durable nonmagnetic and noncorrosive metal and having a portion with external threads and a head portion, and further including an exterior seal on the outer fitting body, and an axial bore through the outer fitting body, the bore including a threaded portion, and an inner bolt body, comprised of a durable nonmagnetic and noncorrosive metal and having a cylindrical portion, a portion with external threads fitted to said threaded portion of the axial bore of the outer fitting body and a tool engagement end, said inner bolt body having a magnet at an end opposite the tool engagement end to draw small magnetic fragments from oil or fluid, the inner bolt body further having an elastomeric sealing ring positioned to seal against the outer fitting body, whereby the drain plug assembly can replace a drain plug in an oil or other liquid sump, with the outer fitting body installed semi-permanently in a threaded oil sump opening and the inner bolt body being removable from and reinsertable into the outer fitting body for access to the sump, while also collecting small magnetic fragments from the sump on the inner bolt body so as to remove them from the sump.

2. The drain plug assembly of claim 1, wherein said durable nonmagnetic and noncorrosive metal comprises 303 alloy Stainless Steel.

3. The drain plug assembly of claim 1, wherein said portion with external threads of said outer fitting body comprises a threaded portion long enough to screw into the fitting of an oil or fluid sump.

4. The drain plug assembly of claim 1, wherein said exterior seal comprises an elastomer O-ring, the outer fitting body including a circular groove in the head within which the O-ring is fitted, the O-ring having an inner diameter slightly smaller than a minimum diameter of the groove and being fitted into the groove such that the O-ring is retained in the groove, the O-ring being positioned to form a seal between the head of the outer fitting body and an exterior surface of an oil sump when the outer fitting body is screwed into the oil sump.

5. The drain plug assembly of claim 1, wherein the outer fitting body has a smooth portion in said axial bore, of smaller diameter than the threaded portion of the axial bore and at a position deeper into the axial bore than the threaded portion, and wherein said cylindrical portion of the inner bolt body is smooth and slightly smaller than the diameter of said smooth portion of the axial bore of the outer fitting body, whereby the smooth cylindrical portion of the inner bolt body enters the slightly larger smooth portion of the axial bore of the outer fitting body to align the threads of the inner bolt body and the outer fitting body on assembly, prior to engagement of the threads.

6. The drain plug assembly of claim 1, wherein said magnet comprises a Neodymium, Iron, and Boron alloy metal, and wherein said magnet is fitted into a recess at the end of said smooth cylindrical portion of said inner bolt body.

7. The drain plug assembly of claim 1, wherein the outer fitting body includes a conical surface adjacent to an inner end of the threaded portion of the axial bore, and the inner bolt body includes a mating conical surface adjacent to the external threads of the inner bolt body, such that when the inner bolt body is tightly screwed into the outer fitting body the conical surfaces tightly engage to form a seal.

8. The drain plug assembly of claim 7, including a further seal comprising an annular groove in the cylindrical portion of the inner bolt body, with an O-ring seal within the groove, the O-ring seal being of a diameter to engage with a surrounding cylindrical surface of the outer fitting body when assembled therein.

* * * * *